(12) United States Patent
Moriya

(10) Patent No.: US 12,486,708 B2
(45) Date of Patent: Dec. 2, 2025

(54) DRIVE DEVICE AND BOOT

(71) Applicant: HI-LEX Corporation, Hyogo (JP)

(72) Inventor: Yohei Moriya, Hyogo (JP)

(73) Assignee: HI-LEX Corporation, Hyogo (JP)

( * ) Notice: Subject to any disclaimer, the term of this patent is extended or adjusted under 35 U.S.C. 154(b) by 0 days.

(21) Appl. No.: 18/683,840

(22) PCT Filed: Mar. 31, 2022

(86) PCT No.: PCT/JP2022/016436
§ 371 (c)(1),
(2) Date: Feb. 15, 2024

(87) PCT Pub. No.: WO2023/021785
PCT Pub. Date: Feb. 23, 2023

(65) Prior Publication Data
US 2024/0352781 A1    Oct. 24, 2024

(30) Foreign Application Priority Data

Aug. 19, 2021   (JP) .................................. 2021-134096

(51) Int. Cl.
*B60R 16/02*    (2006.01)
*E05F 15/616*    (2015.01)

(52) U.S. Cl.
CPC ........ *E05F 15/616* (2015.01); *B60R 16/0215* (2013.01); *E05Y 2900/546* (2013.01)

(58) Field of Classification Search
CPC ............... E05F 15/616; B60R 16/0215; E05Y 2900/546

USPC .......................................................... 295/56
See application file for complete search history.

(56) References Cited

U.S. PATENT DOCUMENTS

| | | | | |
|---|---|---|---|---|
| 6,312,046 | B1 * | 11/2001 | Sora ..................... | B60R 16/0222 |
| | | | | 174/152 G |
| 8,210,604 | B2 * | 7/2012 | Minami ..................... | B60S 1/52 |
| | | | | 296/96.15 |
| 8,648,259 | B2 * | 2/2014 | Gniewek .............. | H02G 3/0468 |
| | | | | 174/152 G |
| 10,569,725 | B2 * | 2/2020 | Ogawa ................ | B60R 16/0222 |
| 2018/0347252 | A1 * | 12/2018 | Zeabari ................. | E05F 15/622 |

(Continued)

FOREIGN PATENT DOCUMENTS

| | | | | |
|---|---|---|---|---|
| CN | 108736408 B | * | 12/2020 | ......... B60R 16/0215 |
| CN | 112421525 A | * | 2/2021 | ............. B60R 16/02 |
| CN | 212671454 U | * | 3/2021 | |

(Continued)

*Primary Examiner* — Daniel J Troy
*Assistant Examiner* — Susan M. Heschel

(57) ABSTRACT

Provided is a drive device for opening and closing opening/closing body 2 supported by vehicle body 3 in an openable and closable manner. The drive device includes drive device main body 11 and boot 12. Drive device main body 11 is connected to vehicle body 3 and opening/closing body 2, and telescopic. A wire extending from drive device main body 11 passes through the inside of boot 12 including boot main body 31 and fitting part 32. Fitting part 32 is disposed at the end of boot main body 31, fits to boot attachment part 24 of drive device main body 11, and includes flat surface part 52b configured to contact drive device main body 11 when fitting part 32 rotates relative to drive device main body 11.

5 Claims, 12 Drawing Sheets

(56) References Cited

U.S. PATENT DOCUMENTS

2019/0169901 A1* 6/2019 Yamagata ................. E05F 1/04

FOREIGN PATENT DOCUMENTS

| CN | 213367382 U | * | 6/2021 | |
|---|---|---|---|---|
| CN | 213753881 U | * | 7/2021 | ............. B60R 16/02 |
| CN | 214036785 U | * | 8/2021 | |
| CN | 110892175 B | * | 3/2023 | ............ E05F 15/622 |
| DE | 102021123729 A1 | * | 3/2023 | ............ E05F 15/622 |
| JP | 2020-176422 | | 10/2020 | |
| JP | 6768401 | | 10/2020 | |
| WO | WO-2007043225 A1 | * | 4/2007 | ......... B60R 16/0215 |
| WO | WO-2007052386 A1 | * | 5/2007 | ......... B60R 16/0215 |
| WO | WO-2018025708 A1 | * | 2/2018 | ................ B60J 5/10 |

* cited by examiner

DRIVE DEVICE AND BOOT

TECHNICAL FIELD

The present invention relates to a drive device and a boot.

BACKGROUND ART

In recent years, drive devices have been used for electrically opening and closing an opening/closing body such as a back door of an automobile. In the drive device for the opening/closing body, for example, a motor extends and retracts the inner cylinder relative to the outer cylinder, thereby opening and closing the opening/closing body (see, for example, Patent Literature (hereinafter, referred to as PTL) 1). A drive device as described in PTL 1 includes a drive device main body in which a motor is disposed, and a boot which is attached to the outside of the drive device main body and through which a wire for driving the motor passes.

CITATION LIST

Patent Literature

PTL 1
Japanese Patent Application Laid-Open No. 2020-176422

SUMMARY OF INVENTION

Technical Problem

In the drive device that opens and closes a back door as described above, the following may occur. When rotational force is applied to an attachment portion of the boot to the drive device main body during the opening and closing of the back door, the attachment portion of the boot rotates relative to the drive device main body, causing the boot to wear to reduce sealing performance.

In addition, when the attachment portion of the boot rotates during transportation, the attaching angle of the boot may shift, making it necessary to adjust the attachment position to the vehicle body, which impairs work efficiency.

An object of the present disclosure is to provide a drive device and a boot capable of preventing the rotation of the boot relative to the drive device main body.

Solution to Problem

A plurality of aspects will be described below as means for solving the problem. These aspects can be arbitrarily combined as necessary.

The drive device according to the first aspect is a drive device for opening and closing an opening/closing body that is supported by a vehicle body in an openable and closable manner, and includes a drive device main body and a boot. The drive device main body is connected to the vehicle body and the opening/closing body, and is telescopic. A wire extending from the drive device main body passes through the inside of the boot. The boot includes a boot main body and a fitting part. The fitting part is disposed at the end of the boot main body and fits with a part to be fitted (referred to as "fitted part") of the drive device main body. The fitting part includes a contact part. The contact part comes into contact with the drive device main body when the fitting part rotates relative to the drive device main body.

With such a configuration, when the fitting part rotates relative to the drive device main body, the contact part comes into contact with the drive device main body, thereby preventing the rotation of the boot. Therefore, it is possible to prevent a reduction in sealing performance which would be caused by friction between the fitting part of the boot and the fitted part of the drive device main body due to rotation of the fitting part of the boot. In addition, deviations in the attachment angle of the boot relative to the drive device main body can be prevented, making it possible to reduce the work required to adjust the attachment position of the boot on a vehicle body, thereby improving work efficiency.

The drive device according to the second aspect is the drive device according to the first aspect, in which the contact part is a flat surface formed opposite to the end surface of the drive device main body.

The portion of the drive device main body where the boot is attached has a structure that is inclined with respect to the end surface of the drive device main body according to the attachment angle of the boot, thereby achieving less space for attaching the boot. In the present disclosure, rotation can be prevented by forming a flat surface on the fitting part, so there is no interference when the boot is attached. Therefore, the boot can be easily attached even when the space for attaching the boot is small.

The drive device according to the third aspect is the drive device according to the second aspect, in which a gap is provided between the contact part and the end surface of the drive device main body.

By providing such a gap, the fitting part of the boot can be easily fitted to the drive device main body.

When there is no gap between the contact part of the fitting part in the boot and the end surface of the drive device main body, the rotation of the fitting part relative to the drive device main body is completely prevented. In such a configuration, when a large rotational force is applied to the fitting part, a gap may be generated between the fitting part and the fitted part of the drive device main body, resulting in reduction of sealing performance. However, a gap is provided in the present disclosure; thus, reduction in sealing performance can be prevented even when a large rotational force is generated in the fitting part.

The drive device according to the fourth aspect is the drive device according any one of the first to third aspects, in which the fitted part is formed in a cylindrical shape.

As the fitted part has a cylindrical shape, the pressing force from the fitting part is applied evenly, and even when a rotational force is applied on the fitting part, forming of a gap between the fitting part and the fitted part can be prevented.

The drive device according to the fifth aspect is the drive device according to the first aspect, in which the drive device main body includes a telescopic part and an attachment end part. The attachment end part protrudes from the end surface (in the extension/retraction direction) of the telescopic part, and a fitted part is disposed on the attachment end part.

With such a configuration, it is possible to prevent a reduction in sealing performance which would be caused by friction between the fitting part of the boot and a boot attaching portion of the drive device main body due to rotation of the fitting part of the boot. In addition, deviations in the attachment angle of the boot relative to the drive device main body can be prevented, making it possible to reduce the work required to adjust the attachment position of the boot on a vehicle body, thereby improving work efficiency.

The boot according to the sixth aspect is a boot through which a wire of a drive device for opening and closing an opening/closing body passes, and the opening/closing body is supported by a vehicle body in an openable and closable manner. The boot includes a boot main body and a fitting part. The boot main body configured to be attachable to the vehicle body. The fitting part is disposed at the end of the boot main body and configured to be fittable to a fitted part of the drive device main body. The fitting part includes a contact part. In a state in which the fitting part fits to the fitted part of the drive device main body, the contact part comes into contact with the drive device main body when the fitting part rotates relative to the drive device main body.

With such a configuration, when the fitting part rotates relative to the drive device main body, the contact part comes into contact with the drive device main body, thereby preventing the rotation of the boot. Therefore, it is possible to prevent a reduction in sealing performance which would be caused by friction between the fitting part of the boot and the fitted part of the drive device main body due to rotation of the fitting part of the boot. In addition, deviations in the attachment angle of the boot relative to the drive device main body can be prevented, making it possible to reduce the work required to adjust the attachment position of the boot on a vehicle body, thereby improving work efficiency.

Advantageous Effects of Invention

The present disclosure can provide a drive device and a boot capable of preventing the rotation of the boot relative to the drive device main body.

DESCRIPTION OF EMBODIMENTS

Hereinafter, a drive device according to an embodiment of the present invention will be described below with reference to the drawings.

Configuration

Outline of Drive Device

Figure 1:
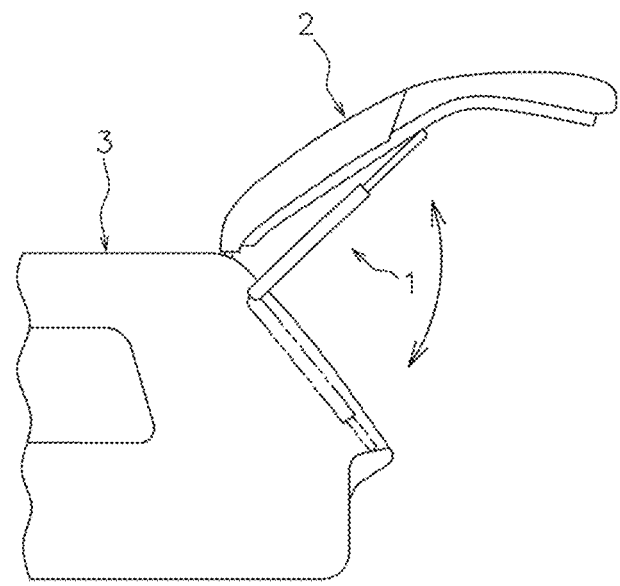
FIG. 1 is a schematic view illustrating a state in which a drive device according to an embodiment of the present disclosure is attached to a vehicle.

FIG. 1 is a schematic side view of a rear part of a vehicle body.

Drive device 1 is a device for opening and closing opening/closing body 2 that is supported by vehicle body 3 in an openable and closable manner. Drive device 1 is connected at its base end to vehicle body 3, which is a fixed object, and connected at its tip to opening/closing body 2, in such a way that opening/closing body 2 is driven by the driving of drive device 1, thereby opening and closing opening/closing body 2. In the present embodiment, drive device 1 is fixed so as to perform a turning operation centered on the connection part with the fixed object, however, drive device 1 does not need to perform a turning operation as long as drive device 1 is fixed to vehicle body 3.

In the example illustrated in FIG. 1, opening/closing body 2 is a back door for opening and closing the rear part of vehicle body 3. Opening/closing body 2 is not limited to this configuration, and may be, for example, a sliding door that opens and closes a side opening, or a window such as an automatic opening/closing window.

Drive device 1 is a device that drives opening/closing body 2 by converting rotational motion of a motor or the like into linear telescopic motion. Drive device 1 includes one end and the other end in the length direction. The one end is connected to opening/closing body 2 on the side closer to the inside of the vehicle body, and the other end is connected to the rear end of vehicle body 3. Drive device 1 can extend and retract in the length direction to drive opening/closing body 2, and is provided so as to move opening/closing body 2 to a fully opened position or a fully closed position.

Drive device 1 is not particularly limited in the placed position or the number thereof for use as long as opening/closing body 2 can be opened and closed. That is, one drive device 1 may be disposed on each of the left and right sides of vehicle body 3 and opening/closing body 2, or on one of the left and right sides of the vehicle body 3 and opening/closing body 2. Two or more drive devices 1 may be disposed. Further, drive device 1 and a gas damper may be used in combination.

Details of Drive Device

Figure 2:
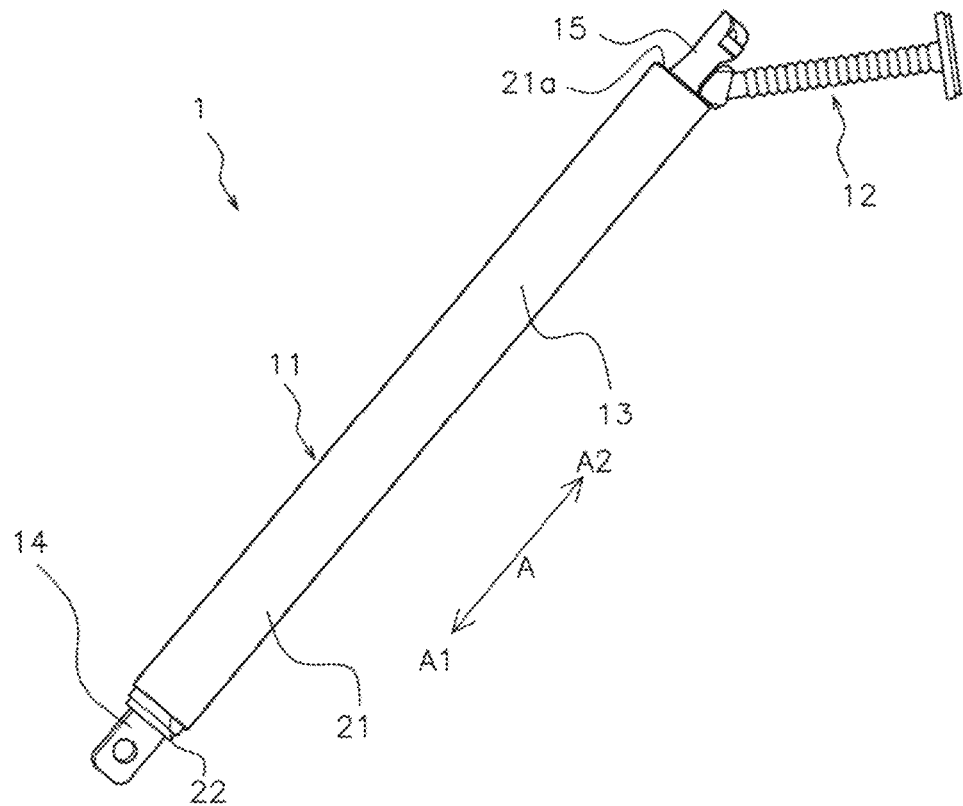
FIG. 2 is a perspective view of the drive device according to the embodiment of the present disclosure.

FIG. 2 is an overall perspective view of drive device 1 of the present embodiment. Drive device 1 includes drive device main body 11 and boot 12. Drive device main body 11 is connected to vehicle body 3 and to opening/closing body 2, and is extendable and retractable (i.e., telescopic). A wire extending from drive device main body 11 passes through the inside of boot 12. Boot 12 is attached at both ends thereof to drive device main body 11 and vehicle body 3, respectively, and protects the wire from rainwater and the like.

Drive Device Main Body 11

Drive device main body 11 includes telescopic part 13, end part on the opening/closing body side (herein also referred to as "opening/closing body side end part") 14, and vehicle body side end part 15 (an example of an attachment end part). Opening/closing body 2 opens and closes with respect to vehicle body 3 by retraction and extension of telescopic part 13. Opening/closing body side end part 14 is disposed at one end of telescopic part 13. Opening/closing body side end part 14 is rotatably attached to opening/closing body 2. Vehicle body side end part 15 is rotatably attached to vehicle body 3.

Telescopic part 13 includes outer cylinder part 21 and inner cylinder part 22. Inner cylinder part 22 is inserted inside outer cylinder part 21. Inner cylinder part 22 moves forward and backward relative to outer cylinder part 21 by the driving of a motor disposed inside outer cylinder part 21.

Opening/closing body side end part 14 is disposed at the tip of inner cylinder part 22. Outer cylinder part 21 includes end surface 21*a* on the opposite side to the end into which inner cylinder part 22 is inserted. Extension/retraction direction A of telescopic part 13 is illustrated. Of extension/retraction direction A, the side on which opening/closing body side end part 14 is located is indicated by first extension/retraction direction A1, and the side opposite to first extension/retraction direction A1 is indicated by second extension/retraction direction A2.

Figure 3:
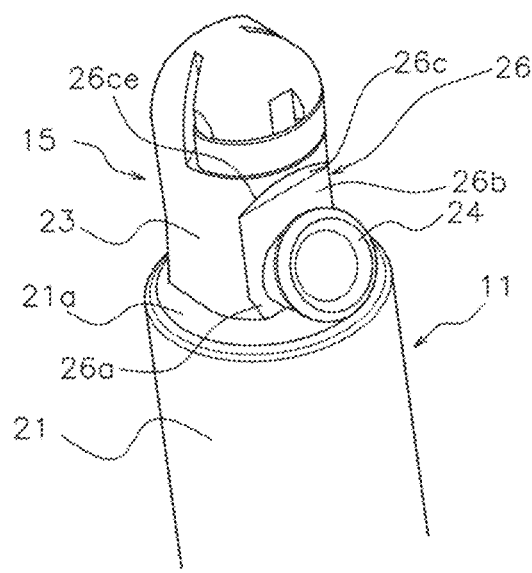
FIG. 3 is a perspective view illustrating an end part of a drive device main body, the end part on the vehicle body side (herein also referred to as "vehicle body side end part") according to the embodiment of the present disclosure.
Figure 4:
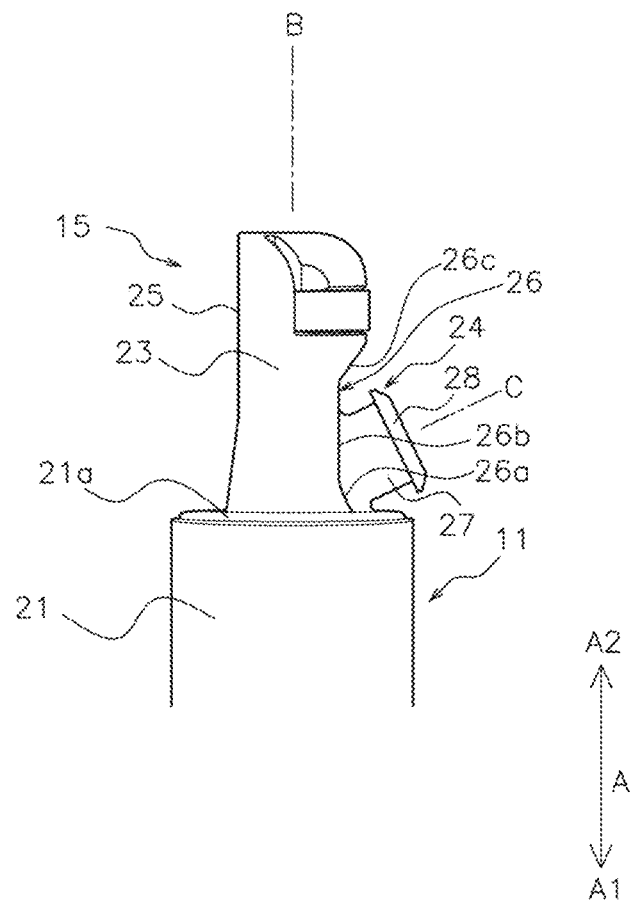
FIG. 4 is a side view illustrating the vehicle body side end part of the drive device main body according to the embodiment of the present disclosure.

FIG. 3 is an enlarged view of vehicle body side end part 15. FIG. 4 is a side view of vehicle body side end part 15. Vehicle body side end part 15 protrudes from end surface 21*a*.

Vehicle body side end part 15 includes end part main body 23 and boot attachment part 24 (an example of a fitted part). As illustrated in FIG. 4, end part main body 23 protrudes from end surface 21*a* in second extension/retraction direction A2. Boot attachment part 24 protrudes from end part main body 23 in an inclined direction inclined with respect to second extension/retraction direction A2.

As illustrated in FIG. 4, end part main body 23 includes flat surface part 25 and side surface part 26. Flat surface part 25 is disposed along extension/retraction direction A. A circular recess (not illustrated) is formed in flat surface part 25 of end part main body 23. Drive device main body 11 is rotatably attached to vehicle body 3 by inserting a protrusion disposed on vehicle body 3 into the recess.

Side surface part 26 is formed in end part main body 23 on the root side (in the vicinity of end surface 21*a*). As illustrated in FIG. 4, side surface part 26 is formed in a recessed shape in end part main body 23. Side surface part 26 includes first main body side portion 26*a*, second main body side portion 26*b*, and third main body side portion 26*c*. First main body side portion 26*a* is an inclined surface formed from the end surface 21*a* and inclined with respect to extension/retraction direction A. First main body side portion 26*a* is formed to be inclined toward central axis B of telescopic part 13 as the distance from first main body side portion 26*a* to end surface 21*a* increases. Second main body side portion 26*b* is a flat surface formed from the end (located opposite to end surface 21*a*) of first main body side portion 26*a* toward second extension/retraction direction A2. Second main body side portion 26*b* is formed along extension/retraction direction A. Third main body side portion 26C is an inclined surface formed from the end (located on the second extension/retraction direction A2 side) of second main body side portion 26*b* and inclined with respect to extension/retraction direction A. Third main body side portion 26*c* is inclined away from central axis B as the distance from third main body side portion 26*c* to end surface 21*a* increases. Herein, terms such as "along," "parallel," "perpendicular," and "toward" do not have strict meanings and include errors, and include concepts that can generally be recognized as "along," "parallel," "perpendicular," and "toward" according to social conventions.

Boot 12 is attached to boot attachment part 24. In the extension/retraction direction of telescopic part 13 (see arrow A), boot attachment part 24 is disposed on side surface part 26 of end part main body 23. Specifically, as illustrated in FIG. 4, boot attachment part 24 is disposed at first main body side portion 26*a* and second main body side portion 26*b* of side surface part 26. Boot attachment part 24 is provided to be inclined with respect to extension/retraction direction A. By providing boot attachment part 24 on side surface part 26 formed in a recessed shape in this manner, fitting part 32 of boot 12 can be attached to boot attachment part 24 without causing fitting part 32 to protrude significantly from outer cylinder part 21. In this manner, it becomes possible to attach fitting part 32 of boot 12 to boot attachment part 24 in a small space.

As illustrated in FIG. 4, boot attachment part 24 includes cylinder part 27 and projection part 28. Cylinder part 27 is disposed across first main body side portion 26*a* and second main body side portion 26*b*. Cylinder part 27 is a cylinder centered on central axis C. Cylinder part 27 is formed in a circular shape when viewed from the direction along central axis C. Cylinder part 27 is disposed to be inclined with respect to extension/retraction direction A in such a way that the distance from central axis C of cylinder part 27 to central axis B increases as the distance from central axis C to end surface 21*a* increases. Projection part 28 is fitted into below-described groove part 54 of boot 12. As illustrated in FIG. 4, projection part 28 is formed at the tip of cylinder part 27. Projection part 28 is formed to spread outward from the entire circumference of the tip of cylinder part 27. Projection part 28 is formed to be inclined toward the base end (side surface part 26 side) of cylinder part 27 from the inside to the outside of cylinder part 27.

Although cylinder part 27 is formed in a circular shape when viewed from the direction along central axis C, cylinder part 27 may be formed in an elliptical shape. However, a circular shape is preferable because the pressing force from below-described fitting part 32 would be applied evenly.

Boot 12

Figure 5:
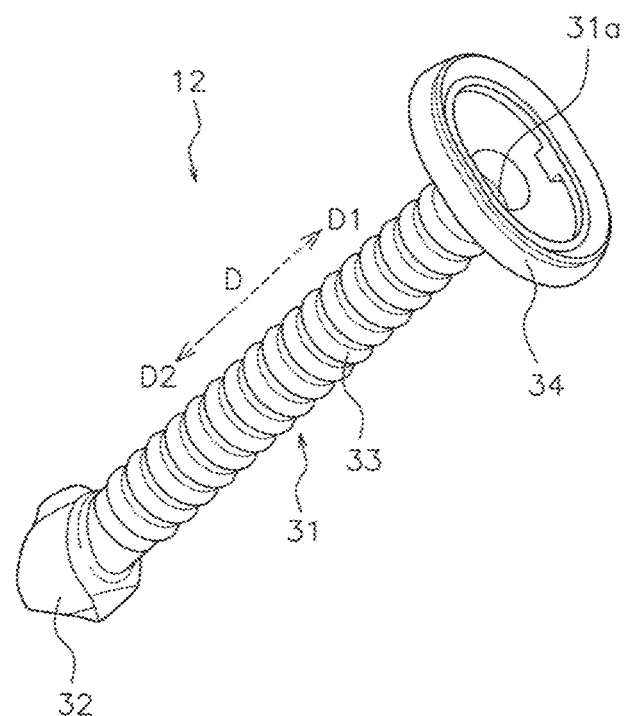
FIG. 5 is a perspective view of a boot according to the embodiment of the present disclosure.
Figure 6:
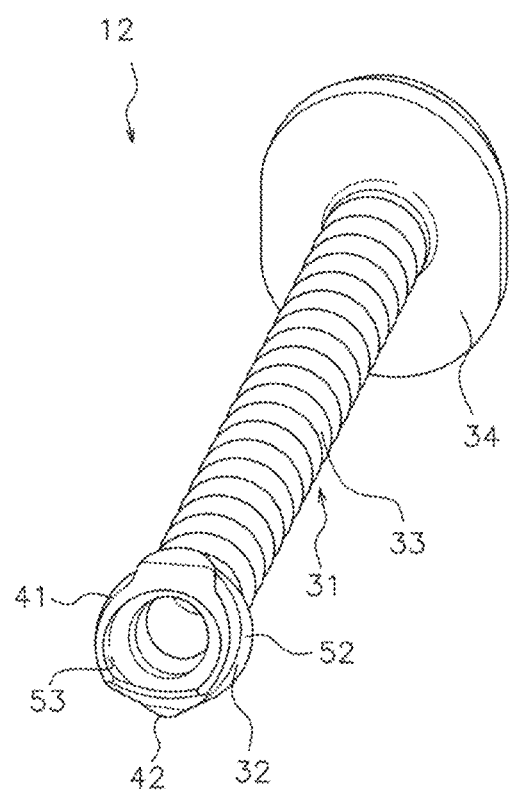
FIG. 6 is a perspective view of the boot according to the embodiment of the present disclosure.
Figure 7:
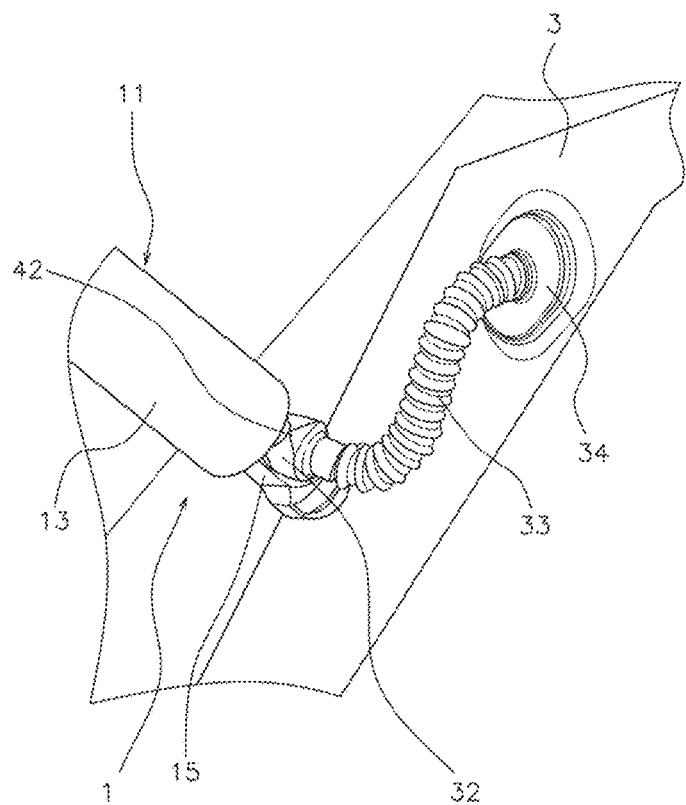
FIG. 7 is a perspective view illustrating a state in which the drive device according to the embodiment of the present disclosure is attached to the vehicle and an opening/closing body is opened.
Figure 8:
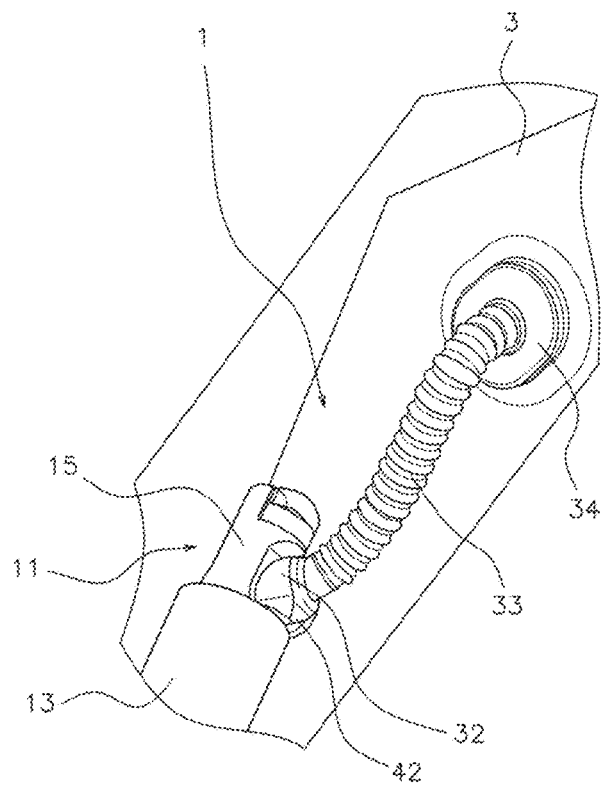
FIG. 8 is a perspective view illustrating a state in which the drive device according to the embodiment of the present disclosure is attached to the vehicle and the opening/closing body is closed.

FIG. 5 is a perspective view illustrating boot 12. FIG. 6 is a perspective view of boot 12 viewed from a different direction from that of FIG. 5. FIG. 7 is a perspective view illustrating a state in which drive device 1 is attached to vehicle body 3 and opening/closing body 2 and opening/closing body 2 is opened. FIG. 8 is a perspective view illustrating a state in which drive device 1 is attached to vehicle body 3 and opening/closing body 2 and opening/closing body 2 is closed.

Boot 12 is formed of an elastic member such as rubber. As illustrated in FIGS. 5 and 6, boot 12 includes boot main body 31 and fitting part 32. A wire extending from drive device main body 11 passes through the inside of boot main body 31. Fitting part 32 is disposed at the end of boot main body 31 and attached to drive device main body 11.

Boot Main Body 31

Figure 11A:
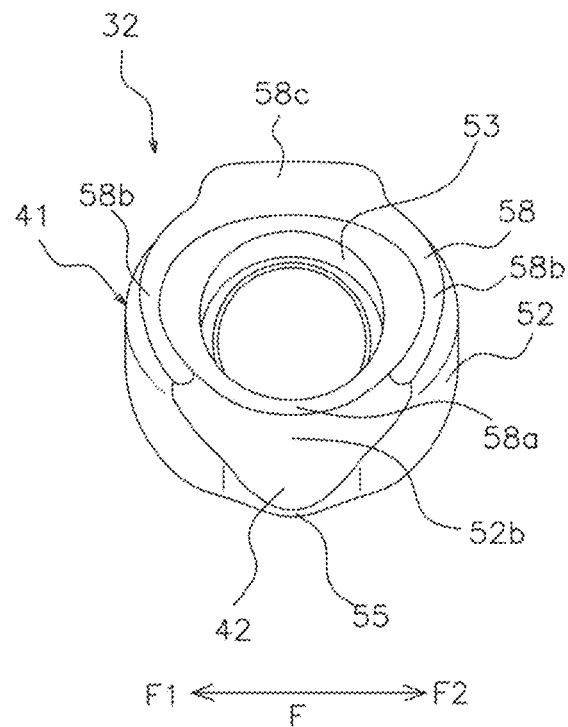
FIG. 11A is a front view of the fitting part according to the embodiment of the present disclosure.
Figure 11B:
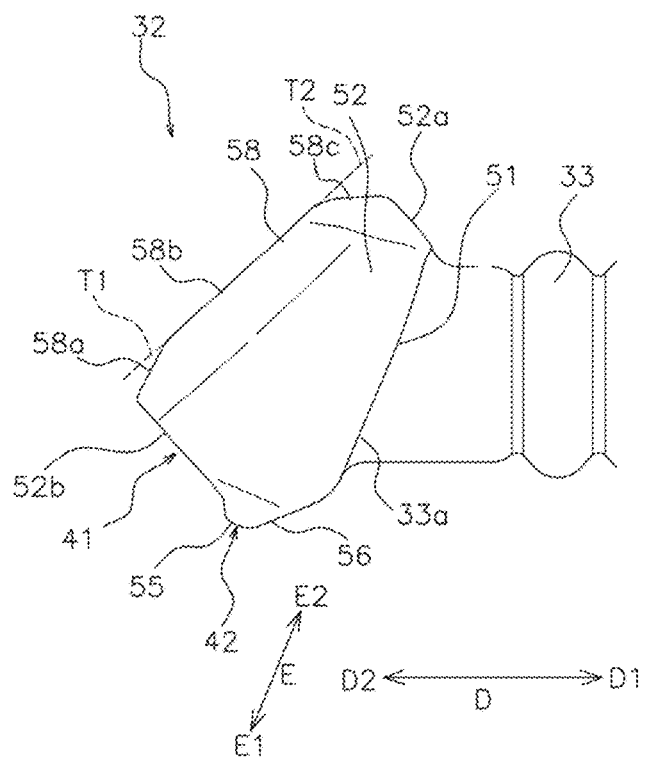
FIG. 11B is a side view of the fitting part according to the embodiment of the present disclosure.

As illustrated in FIG. 5, insertion hole 31a through which an electric wire is inserted is provided inside boot main body 31. As illustrated in FIGS. 5 and 6, boot main body 31 includes bellow part 33 and vehicle body attachment part 34. As illustrated in FIGS. 7 and 8, bellow part 33 curves in accordance with the rotation of drive device 1 accompanied by the opening and closing of opening/closing body 2. As illustrated in FIG. 11B described below, end 33a of bellow part 33 on the fitting part main body 41 side is formed to be inclined with respect to a direction perpendicular to longitudinal direction D (the longitudinal direction when bellow part 33 is extended linearly).

As illustrated in FIGS. 5 and 6, vehicle body attachment part 34 is disposed at an end of bellow part 33. Vehicle body attachment part 34 is formed outward from the periphery of the end of bellow part 33. Vehicle body attachment part 34 has a substantially elliptical shape. As illustrated in FIGS. 7 and 8, vehicle body attachment part 34 is attached to vehicle body 3. Vehicle body attachment part 34 is fitted into a recess (not illustrated) formed in vehicle body 3, for example. A hole, through which a wire passes, is formed inside this recess, and the wire passing through boot 12 is inserted into the hole.

Fitting Part 32

Figure 9:
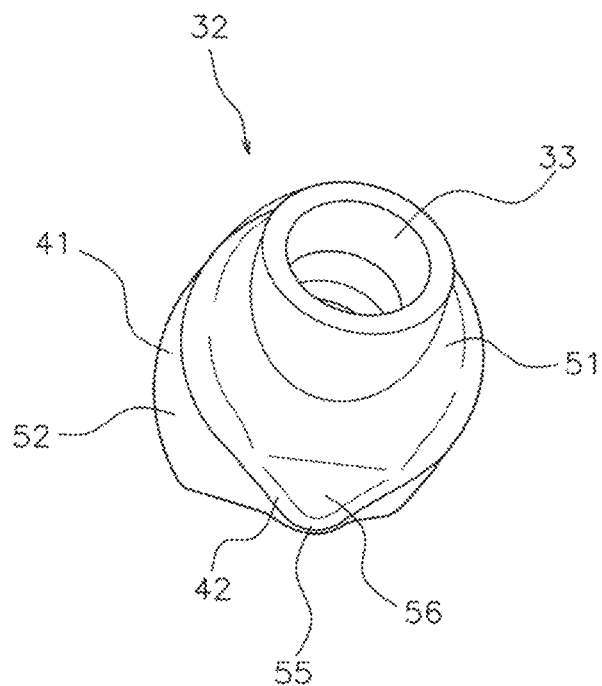
FIG. 9 is a perspective view of a fitting part according to the embodiment of the present disclosure.
Figure 10:
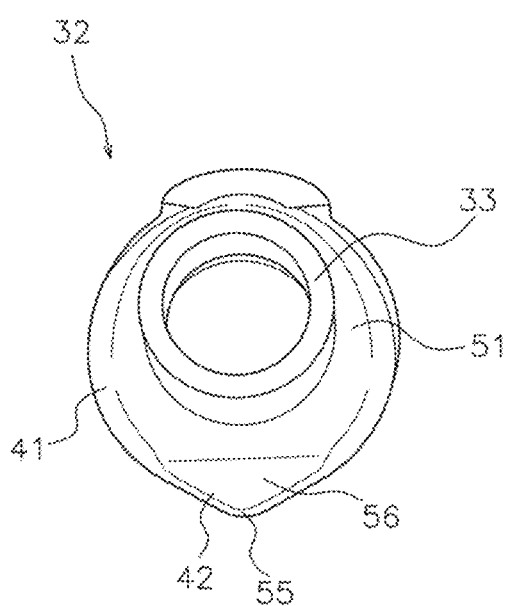
FIG. 10 is a perspective view of the fitting part according to the embodiment of the present disclosure.
Figure 11C:
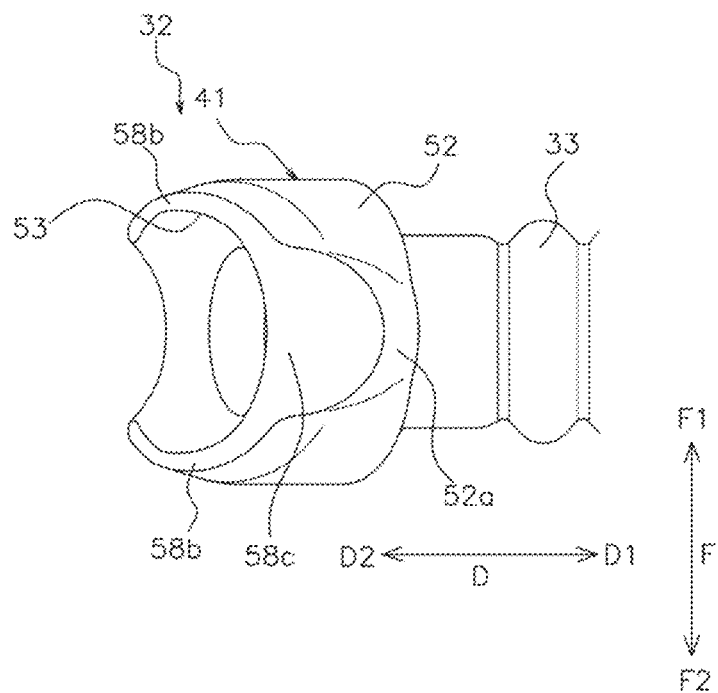
FIG. 11C is a top view of the fitting part according to the embodiment of the present disclosure.
Figure 11D:
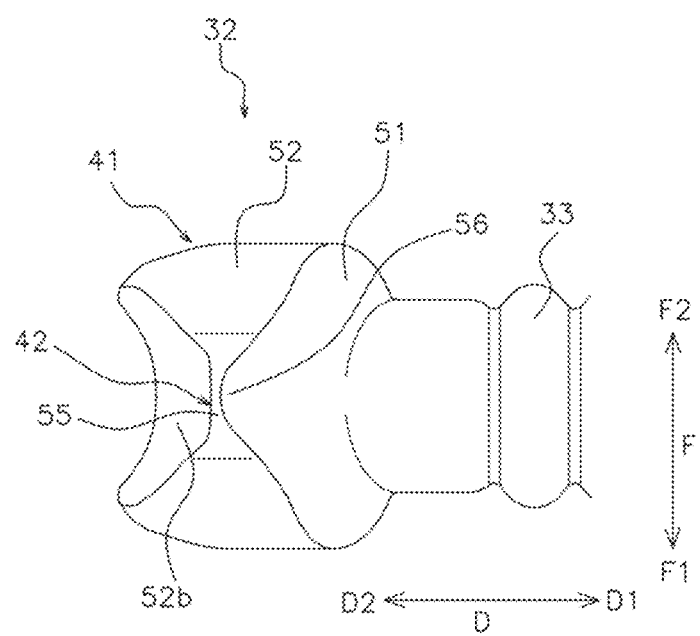
FIG. 11D is a back view of the fitting part according to the embodiment of the present disclosure.
Figure 12:
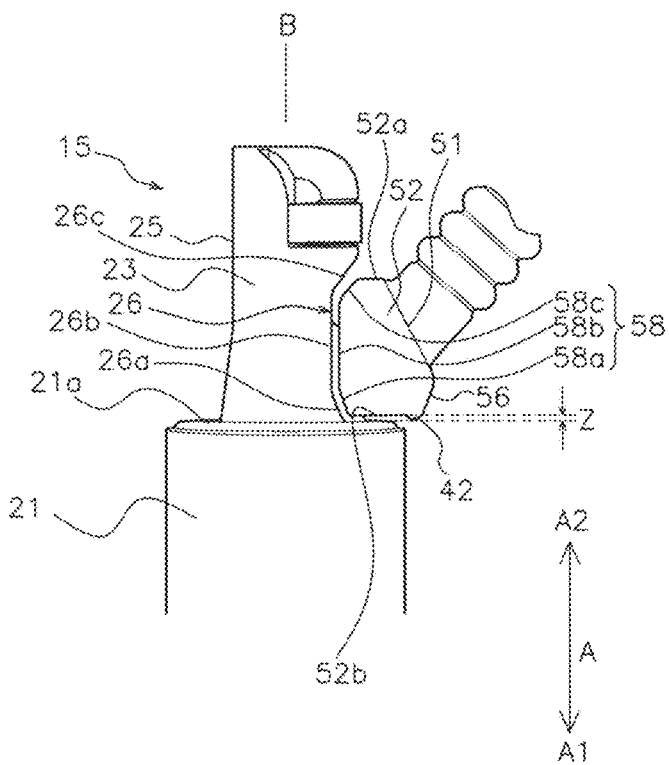
FIG. 12 is a side view illustrating a state in which the fitting part of the boot according to the embodiment of the present disclosure is attached to a boot attachment part of the drive device main body.
Figure 13:
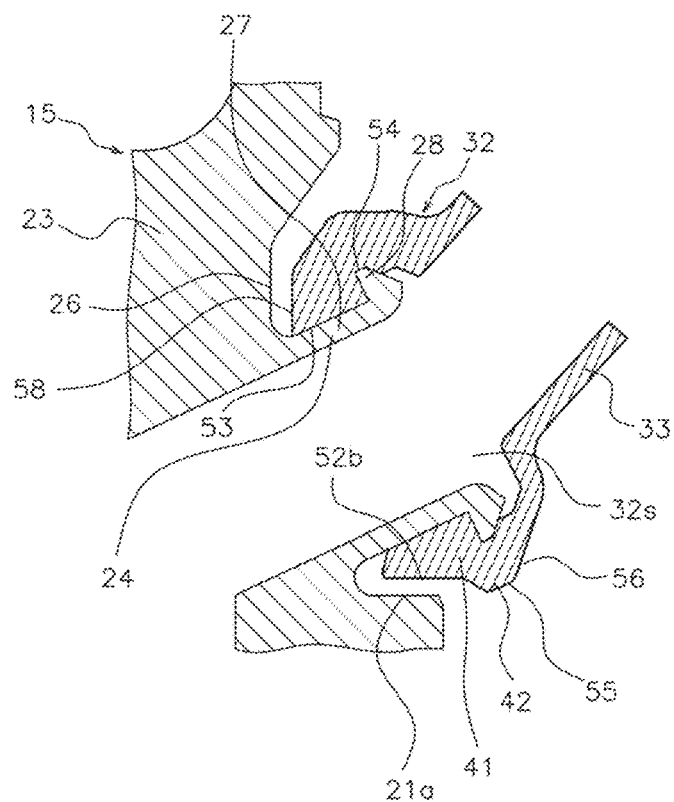
FIG. 13 is a partial cross-sectional view illustrating a state in which the fitting part of the boot according to the embodiment of the present disclosure is attached to the boot attachment part of the drive device main body.

FIG. 9 is a perspective view of fitting part 32. FIG. 10 is a perspective view of fitting part 32 viewed from a different direction from that of FIG. 9. FIG. 11A is a front view of fitting part 32. FIG. 11B is a side view of fitting part 32. FIG. 11C is a top view of fitting part 32. FIG. 11D is a bottom view of fitting part 32. FIG. 12 is a side view illustrating a state in which fitting part 32 of boot 12 is attached to boot attachment part 24 of drive device main body 11. FIG. 13 is a partially enlarged cross-sectional view of FIG. 12 through central axis B and central axis C.

As illustrated in FIG. 5, of longitudinal direction D of boot 12, a direction toward vehicle body attachment part 34 is defined as first longitudinal direction D1, and a direction toward the fitting part 32 side is defined as second longitudinal direction D2. In addition, in the side view of FIG. 11B, the direction along end 33a of bellow part 33 is defined as inclination direction E. Of inclination direction E, one direction is defined as first inclination direction E1 (direction toward below-described protruding part 42), and the other direction opposite to first inclination direction E1 is defined as a second inclination direction E2. The direction perpendicular to longitudinal direction D in the top view of FIG. 11C is defined as width direction F. Of width direction F, one direction is defined as first width direction F1, and the other direction opposite to first width direction F1 is defined as second width direction F2.

As illustrated in FIGS. 5 and 6, fitting part 32 is disposed at the end of bellow part 33 on the side opposite from vehicle body attachment part 34. As illustrated in FIGS. 9 and 10, fitting part 32 includes fitting part main body 41 and protruding part 42. Fitting part main body 41 is attached to boot attachment part 24. Protruding part 42 is formed to drain rainwater. In a state in which fitting part 32 is attached to boot attachment part 24, protruding part 42 protrudes toward the outside of drive device main body 11, as illustrated in FIGS. 12 and 13.

Fitting Part Main Body 41

As illustrated in FIG. 13, boot attachment part 24 described above is inserted into fitting part main body 41. Fitting part main body 41 is formed to cover boot attachment part 24 and has a substantially cylindrical shape. As illustrated in FIG. 5, fitting part main body 41 is formed to have a larger outer diameter than that of bellow part 33. As illustrated in FIGS. 11A and 11B, fitting part main body 41 includes end surface 51, outer peripheral surface 52, opening 53, and groove part 54 (see FIG. 13).

End surface 51 is formed outward from end 33a of bellow part 33. Specifically, as illustrated in FIGS. 11B and 11D, end surface 51 is formed to protrude from end 33a outward other than second inclination direction E2. End surface 51 is formed parallel to end 33a of bellow part 33.

Outer peripheral surface 52 is formed perpendicularly to end surface 51 from end surface 51 and end 33a. As illustrated in FIG. 11B, outer peripheral surface portion 52a, which is a portion of outer peripheral surface 52 on the second inclination direction E2 side, is formed from end 33a, and a portion of outer peripheral surface 52 other than outer peripheral surface portion 52a is formed from the end of end surface 51. Outer peripheral surface portion 52a is a portion on which an operator's fingers are placed when boot 12 is attached to drive device main body 11.

In a state in which fitting part 32 is attached to boot attachment part 24, tip 58 of outer peripheral surface 52 is formed to face (to be opposite) side surface part 26, as illustrated in FIG. 12.

As illustrated in FIG. 11B, tip 58 of outer peripheral surface 52 is provided to be inclined with respect to the end surface 51. As illustrated in FIG. 11B, tip 58 is formed in such a way that the distance from tip 51 to end surface 51 generally increases toward first inclination direction E1. As in the side view illustrated in FIG. 11B, tip 58 includes first boot side portion 58a, second boot side portion 58b, and third boot side portion 58c. First boot side portion 58a is the end portion of tip 58 on the first inclination direction E1 side. Third boot side portion 58c is the end portion of tip 58 on the second inclination direction E2 side. Second boot side portion 58b is disposed between first boot side portion 58a and third boot side portion 58c. As FIG. 11B is a side view, only one second boot side portion 58b is illustrated. However, as tip 58 is annular, there is also second boot side portion 58b on the back side of the drawing (see FIG. 11A). In the side view, first boot side portion 58a is formed to be inclined with respect to second boot side portion 58b. First boot side portion 58a is formed to be inclined with respect to second boot side portion 58b in such a way that the distance from first boot side portion 58a to extension line T1 (extending from second boot side portion 58b toward first inclination direction E1) increases toward first inclination direction E1. In the side view, third boot side portion 58c is formed to be inclined with respect to second boot side portion 58b. Third boot side portion 58c is formed to be inclined with respect to second boot side portion 58b in such a way that the distance from third boot side portion 58c to extension line T2 (extending from second boot side portion 58b toward second inclination direction E2) increases toward second inclination direction E2.

In a state in which fitting part 32 is attached to boot attachment part 24, first boot side portion 58a faces first main body side portion 26a, second boot side portion 58b faces second main body side portion 26b, and third boot side portion 58c faces third main body side portion 26c, as illustrated in FIG. 12.

As illustrated in FIGS. 11A and 11B, outer peripheral surface 52 includes flat surface part 52b (an example of a contact part). Flat surface part 52b is disposed at the outer peripheral surface 52 on the first inclination direction E1 side. In a state in which fitting part 32 is attached to boot attachment part 24, flat surface part 52b faces end surface 21a of drive device main body 11. In addition, gap Z is formed between flat surface part 52b and end surface 21a, as illustrated in FIG. 12.

Figure 14A:
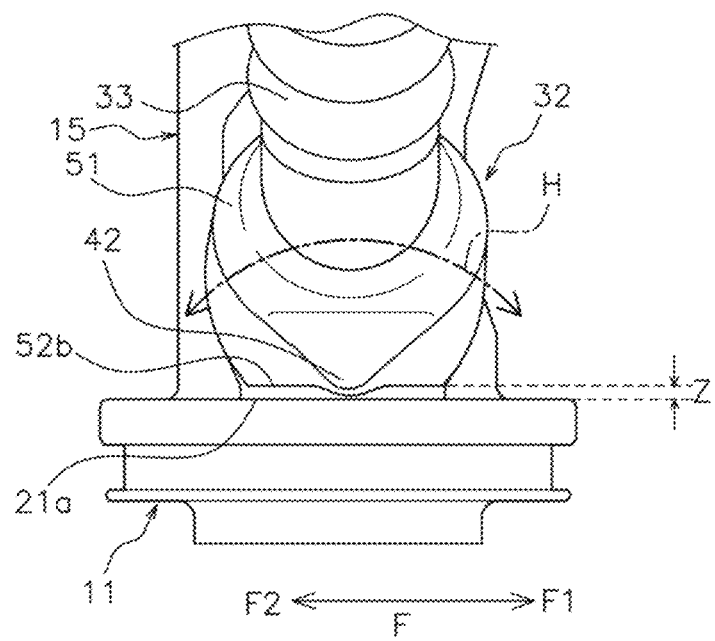
FIG. 14A illustrates a side view of a state in which the fitting part of the boot according to the embodiment of the present disclosure is attached to the boot attachment part of the drive device main body.

FIG. 14A illustrates a side view of drive device 1 in FIG. 12 viewed from the right side.

Figure 14B:
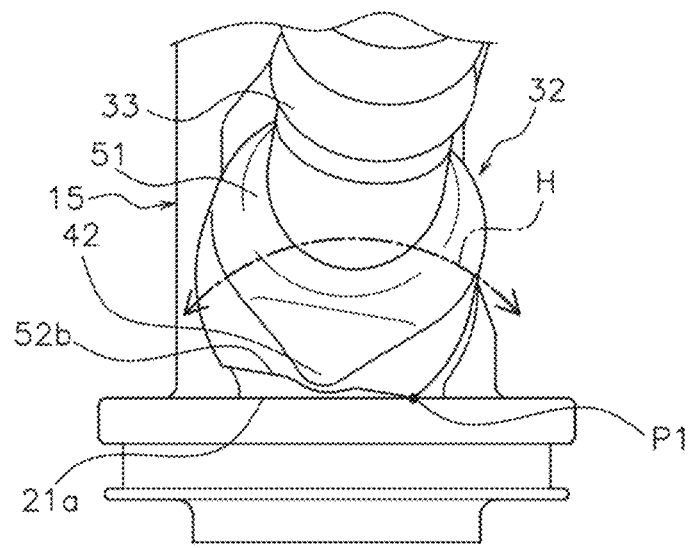
FIG. 14B illustrates a state in which the fitting part rotates relative to the drive device main body and comes into contact with the drive device main body from the state in FIG. 14A.

Flat surface part 52b comes into contact with end surface 21a when fitting part 32 of boot 12 rotates relative to boot attachment part 24 of drive device main body 11 (see arrow H). FIG. 14B illustrates a state in which fitting part 32 rotates and flat surface part 52b comes into contact with end surface 21a. FIG. 14B illustrates a state in which fitting part 32 rotates clockwise relative to boot attachment part 24. P1 indicates the contact position. By flat surface part 52b coming into contact with end surface 21a in this manner, rotation of fitting part 32 relative to boot attachment part 24 is restricted. Specifically, the end part of flat surface part 52b on the first width direction F1 side contacts end surface 21a. The contact between flat surface part 52b and end surface 21a may be surface contact or line contact as long as rotation of the fitting part is restricted.

Gap Z may have any size as long as flat surface part 52b can contact end surface 21a when a rotational force is applied to fitting part 32 accompanied by the opening and closing of the opening/closing body. In the present embodiment, it is preferable that boot attachment part 24 is formed in a circular shape when viewed from the direction along the central axis C, and below-described groove part 54 is also formed in a circular shape, because the pressing force from fitting part 32 would be applied evenly. However, such circular shapes may cause easier rotation as opening/closing body 2 is opened and closed. In the present disclosure, however, when fitting part 32 rotates relative to boot attachment part 24, flat surface part 52b comes into contact with end surface 21a to restrict the rotation. Therefore, it is possible to prevent a reduction in sealing performance which would be caused by friction between fitting part 32 and boot attachment part 24. In this manner, sealing performance can be maintained while applying an even pressing force.

As illustrated in FIG. 11A, opening 53 is formed inside tip 58 of outer peripheral surface 52. Boot attachment part 24 is inserted into opening 53. Tip 58 forms the edge of opening 53. Opening 53 has a circular shape. Opening 53 communicates with insertion hole 31a (see FIG. 5), which is provided inside boot main body 31 and through which an electric wire is inserted.

As illustrated in FIG. 13, groove part 54 fits with projection part 28 of boot attachment part 24. Groove part 54 is configured such that a space formed by the pair of side surfaces of groove part 54 and the bottom surface of groove part 54 communicates with internal space 32s that communicates with opening 53 of fitting part 32. Specifically, groove part 54 is a recess into which projection part 28 is inserted, and is formed all around the inner wall of internal space 32s. Groove part 54 is formed in a circular shape. When fitting part 32 is pushed into boot attachment part 24 so that boot attachment part 24 is inserted inside opening 53, projection part 28 is fitted into groove part 54 due to elastic deformation of fitting part 32.

Protruding Part 42

Protruding part 42 discharges rainwater that has flowed from boot main body 31 and reached fitting part 32, from boot 12. As illustrated in FIG. 11B, protruding part 42 is disposed between flat surface part 52b and end surface 51. Protruding part 42 protrudes toward first inclination direction E1. Further, in a state in which fitting part 32 is attached to boot attachment part 24, protruding part 42 protrudes toward the outside of drive device main body 11, as illustrated in FIG. 12. In the present embodiment, protruding part 42 protrudes toward first extension/retraction direction A1 as illustrated in FIG. 12; however, the configuration is not limited thereto, and protruding part 42 may protrude radially outward of outer cylinder part 21. It is preferable that protruding part 42 protrudes so as to guide rainwater to the outside of drive device main body 11.

In addition, protruding part 42 is provided with inclined surface 56. Inclined surface 56 is a surface that connects the portion of end surface 51 on the first inclination direction E1 side with tip part 55, and is a surface of protruding part 42 on the boot main body 31 side. In a state in which fitting part 32 is attached to boot attachment part 24, inclined surface 56 is inclined so as to approach drive device main body 11 from the end surface 51 side toward tip part 55, as illustrated in FIG. 13. In addition, inclined surface 56 is inclined so as to be located radially outward from central axis B of boot main body 31 as the distance from inclined surface 56 to end surface 51 increases.

In the present embodiment, protruding part 42 has a substantially triangular shape in the front view (FIGS. 9 and 11A), and a substantially triangular shape in the side view (FIG. 11B).

Attaching Boot to Drive Device Main Body

Figure 15A:
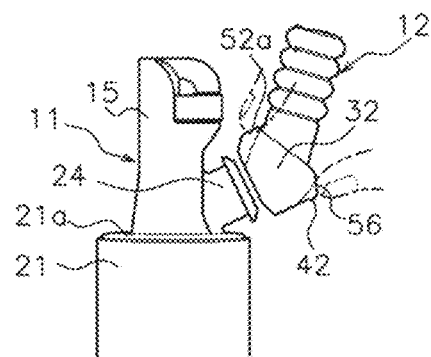
FIGS. 15A to 15C illustrate the operation of attaching the boot to the drive device main body.
Figure 15B:
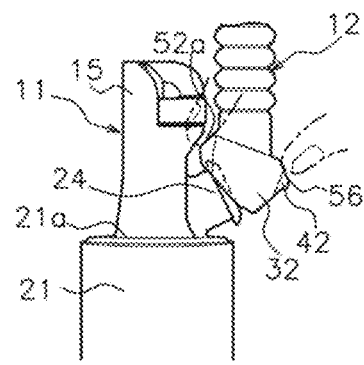
Figure 15C:
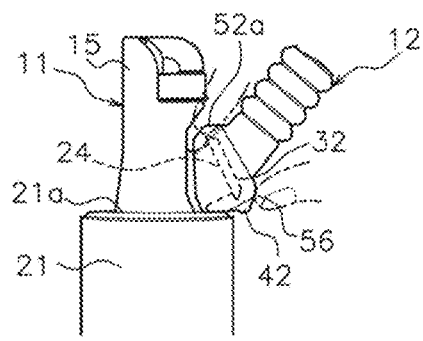

FIGS. 15A to 15C illustrate the operation of attaching boot 12 to drive device main body 11.

As illustrated in FIG. 15A, an operator grasps outer peripheral surface portion 52a and inclined surface 56 (on the boot main body 31 side) of protruding part 42 with fingers (indicated by dotted lines) and brings fitting part 32 of boot 12 close to boot attachment part 24 of drive device main body 11.

As illustrated in FIG. 15B, fitting part 32 is then fitted to boot attachment part 24 from outer peripheral surface portion 52a. At this time, by pressing the outer peripheral surface portion 52a with a finger, projection part 28 is fitted into the portion of groove part 54 on the outer peripheral surface portion 52a side (the portion on the first inclination direction E1 side).

Figure 15D:
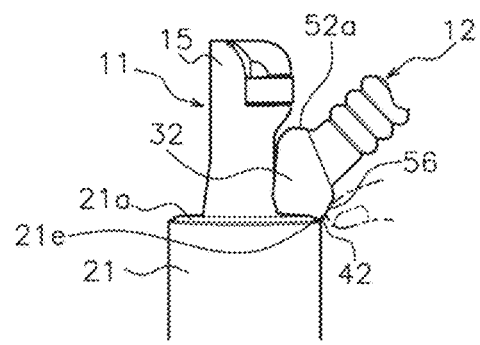
FIG. 15D illustrates a state in which a protruding part of the boot comes into contact with the drive device main body.

Subsequently, as illustrated in FIG. 15C, projection part 28 is fitted into the portion of groove part 54 on the protruding part 42 side (the portion on the second inclination direction E2 side) by pressing inclined surface 56 toward boot attachment part 24 with a finger. When inclined surface 56 is pressed with the finger, protruding part 42 comes into contact with edge 21e (an example of an end part of the drive device main body) of end surface 21a of drive device main body 11, as illustrated in FIG. 15D. This configuration restricts the insertion of fitting part 32 into boot attachment part 24, making positioning and attachment easier without being excessively pushed.

Effects and the Like

As described above, rotation of boot 12 can be prevented by the presence of flat surface part 52b configured to come into contact with drive device main body 11 when fitting part 32 rotates relative to drive device main body 11. Therefore, it is possible to prevent a reduction in sealing performance which would be caused by friction between fitting part 32 of boot 12 and boot attachment part 24 (an example of a fitted part) of drive device main body 11 due to rotation of fitting part 32 of boot 12. In addition, deviations in the attachment angle of boot 12 relative to drive device main body 11 can be prevented, making it possible to reduce the work required to adjust the attachment position of boot 12 on vehicle body 3, thereby improving work efficiency.

In addition, by using flat surface part 52b as the portion that comes into contact with drive device main body 11 when fitting part 32 rotates relative to drive device main body 11, the following effects can be obtained. The portion of drive device main body 11 to which boot 12 is attached is set so that boot 12 is attached at a predetermined angle in such a way that when drive device 1 is attached to a vehicle, a wire led out from boot attachment part 24 for routing is prevented from being bent. The portion has a structure that is inclined with respect to end surface 21a of drive device main body 11 according to the attachment angle of boot 12, thereby achieving less space for attaching boot 12 (refer to side surface part 26). In the present disclosure, rotation can be prevented by forming a flat surface on fitting part 32, so there is no interference when the boot is attached. Therefore, boot 12 can be easily attached even when the space for attaching the boot is small.

In addition, by providing gap Z between flat surface part 52b and end surface 21a of drive device main body 11, fitting part 32 of boot 12 can be easily fitted to drive device main body 11. When there is no gap between flat surface part 52b of fitting part 32 in boot 12 and end surface 21a of drive device main body 11, the rotation of fitting part 32 relative to drive device main body 11 is completely prevented. In such a configuration, when a large rotational force is applied to fitting part 32, a gap may be generated between groove part 54 and projection part 28, resulting in reduction of sealing performance. However, gap Z is provided in the present disclosure; thus, reduction in sealing performance can be prevented even when a large rotational force is generated in fitting part 32.

As boot attachment part 24 is formed in a cylindrical shape, the pressing force from fitting part 32 is applied evenly, and even when a rotational force is applied on fitting part 32, forming of a gap between fitting part 32 and boot attachment part 24 can be prevented.

Other Embodiments

Although one embodiment of the present disclosure has been described above, the present disclosure is not limited to the above embodiment, and various changes can be made without departing from the scope of the present disclosure.

A. In the above embodiment, flat surface part 52b is provided on fitting part 32 as an example of the contact part; however, the part is not limited to a flat surface. The contact part may have any configuration as long as the contact part can come into contact with drive device main body 11, particularly vehicle body side end part 15, thereby preventing rotation of fitting part 32 that would cause wear in the drive device and reduce sealing performance.

Figure 16A:
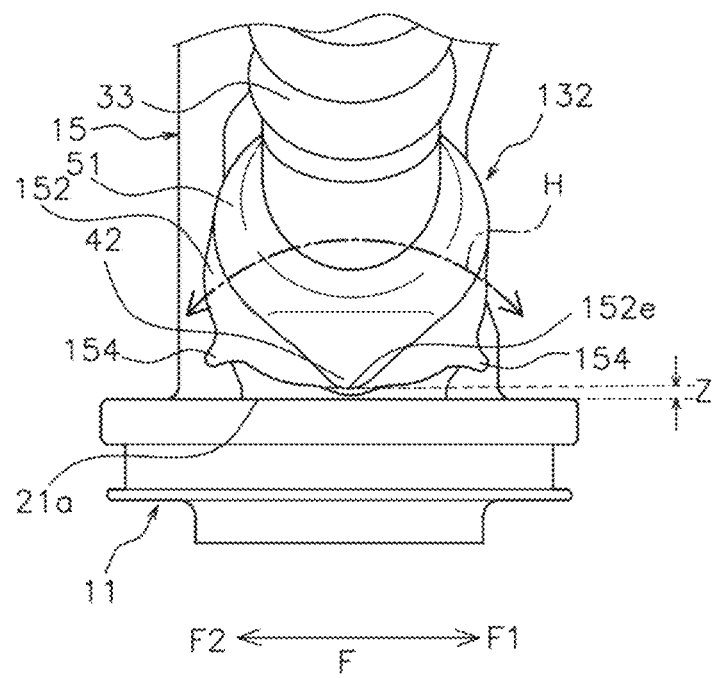
FIG. 16A illustrates a side view of a state in which a fitting part of a boot in a variation according to the embodiment of the present disclosure is attached to the boot attachment part of the drive device main body.

For example, as illustrated in FIG. 16A, outer peripheral surface 52 does not need to include a flat surface portion formed therein. Outer peripheral surface 152 may be formed in a cylindrical shape and include contact parts 154 protruding therefrom, as illustrated in fitting part 132 in FIG. 16A. Contact part 154 comes into contact with end surface 21a of drive device main body 11 when fitting part 132 rotates relative to drive device main body 11. Two contact parts 154 are disposed with the end of outer peripheral surface 152 on the first inclination direction E1 side (indicated by 152e in FIG. 16A) therebetween. Two contact parts 254 are disposed with end 152e therebetween in width direction F.

Figure 16B:
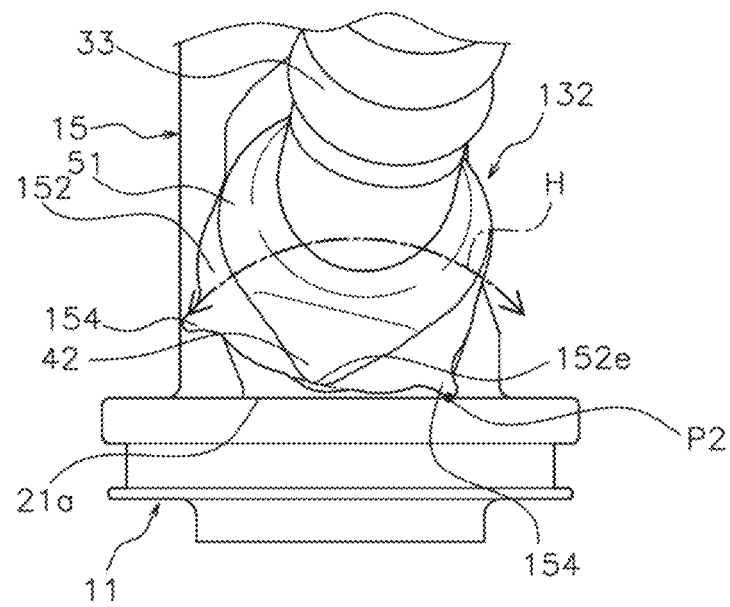
FIG. 16B illustrates a state in which the fitting part rotates relative to the drive device main body and comes into contact with the drive device main body from the state in FIG. 16A.

FIG. 16B illustrates a state in which fitting part 132 rotates and contact part 154 comes into contact with end surface 21a. FIG. 16B illustrates a state in which fitting part 132 rotates clockwise relative to drive device main body 11. P2 indicates the contact position. By contact part 154 coming into contact with end surface 21a in this manner, rotation of fitting part 132 relative to drive device main body 11 is restricted.

B. In the above embodiment, flat surface part 52b, which is an example of a contact part provided on boot 12, contacts end surface 21a, but boot 12 does not necessarily contact at end surface 21a.

Figure 17A:
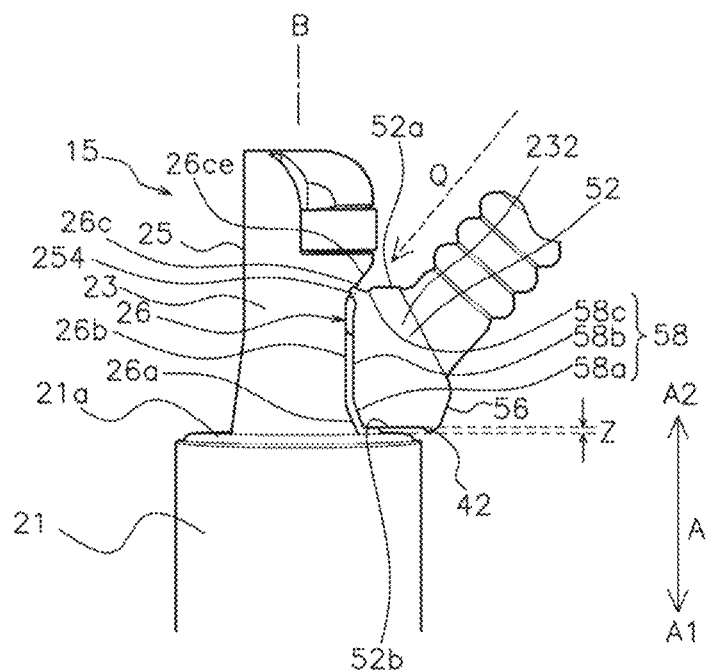
FIG. 17A illustrates a side view of a state in which a fitting part of a boot in a variation according to the embodiment of the present disclosure is attached to the boot attachment part of the drive device main body.
Figure 17B:
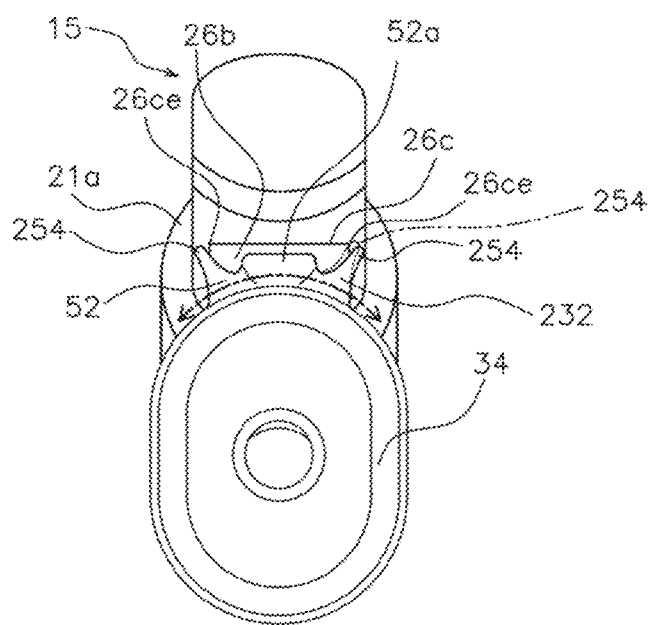
FIG. 17B illustrates the boot and drive device main body of FIG. 17A as viewed along arrow Q.

For example, boot 12 may come into contact with edge 26ce (see FIG. 3) of third main body side portion 26c. FIG. 17A is a side view illustrating a state in which fitting part 232 including contact part 254 configured to contact edge 26ce of third main body side portion 26c is fitted to vehicle body side end part 15. FIG. 17B illustrates vehicle body side end part 15 and boot 12 of drawing FIG. 17A as viewed along arrow Q.

As illustrated in FIGS. 17A and 17B, a pair of contact parts 254 protruding outward from third boot side portion 58c are disposed with outer peripheral surface portion 52a therebetween in width direction F. In a state in which boot 12 is attached to vehicle body side end part 15, the pair of contact parts 254 are disposed with third main body side portion 26c therebetween. Contact part 254 in a state of contacting edge 26ce of third main body side portion 26c due to the rotation of fitting part 232 is indicated by a two-dot chain line.

By contact part 254 coming into contact with vehicle body side end part 15 of drive device main body 11 in this manner, rotation of fitting part 232 relative to drive device main body 11 is restricted.

C. Two contact parts 154 (or 254) are provided in variation A (or B); however, when boot 12 is more likely to rotate in one direction, only one contact part 154 or 254 may be provided to restrict rotation in that one direction.

D. In the above embodiment, fitting part 32 is provided with protruding part 42, but protruding part 42 is not necessary.

INDUSTRIAL APPLICABILITY

The drive device and boot of the present disclosure have the effect of reducing the rotation of the boot relative to the drive device main body, and are particularly advantageous, for example, as a drive device for opening and closing a back door of a vehicle body.

REFERENCE SIGNS LIST

1 Drive device
2 Opening/closing body
3 Vehicle body
11 Drive device main body
12 Boot
31 Boot main body
32 Fitting part
52*b* Flat surface part
Z Gap

The invention claimed is:

1. A drive device for opening and closing an opening/closing body that is supported by a vehicle body in an openable and closable manner, the drive device comprising:
 a drive device main body connected to the vehicle body and the opening/closing body, the drive device main body including a telescopic part; and
 a boot through which a wire extending from the drive device main body passes, wherein
 the boot includes
  a boot main body configured to be attachable to the vehicle body, and
  a fitting part configured to be fittable to a fitted part of the drive device main body, the fitting part being disposed at an end of the boot main body, and
 the fitting part includes a contact part that is opposite to an end surface of the drive device main body, wherein a gap is provided between the contact part and the end surface of the drive device main body, and the gap has a size such that the contact part is able to come into contact with the end surface of the drive device main body when the fitting part rotates relative to the drive device main body, and
 the fitting part is rotatable relative to the drive device main body when the gap still exists between the contact part and the end surface of the drive device main body and the contact part is not in contact with the drive device main body, and
 the rotation of the fitting part relative to the drive device main body is restricted when the gap no longer exists between the contact part and the end surface of the drive device main body and the contact part is in contact with the end surface of the drive device main body.

2. The drive device according to claim 1, wherein the contact part is a flat surface formed opposite to an end surface of the drive device main body.

3. The drive device according to claim 1, wherein the fitted part is formed in a cylindrical shape.

4. The drive device according to claim 1, wherein the drive device main body includes
 an attachment end part on which the fitted part is disposed and which protrudes from an end surface of the telescopic part, the end surface being an end surface in an extension/retraction direction of the telescopic part.

5. A boot through which a wire of a drive device for opening and closing an opening/closing body passes, the opening/closing body being supported by a vehicle body in an openable and closable manner, the boot comprising:
 a boot main body configured to be attachable to the vehicle body; and
 a fitting part configured to be fittable to a fitted part of a drive device main body, the fitting part being disposed at an end of the boot main body, wherein
 the fitting part includes a contact part that is opposite to an end surface of the drive device main body, wherein a gap is provided between the contact part and the end surface of the drive device main body, and the gap has a size such that the contact part is able to come into contact with the end surface of the drive device main body when the fitting part rotates relative to the drive device main body, and
 the fitting part is rotatable relative to the drive device main body when the gap still exists between the contact part and the end surface of the drive device main body and the contact part is not in contact with the drive device main body, and
 the rotation of the fitting part relative to the drive device main body is restricted when the gap no longer exists between the contact part and the end surface of the drive device main body and the contact part is in contact with the end surface of the drive device main body.

* * * * *